United States Patent [19]

Grallert

[11] Patent Number: 5,224,128
[45] Date of Patent: Jun. 29, 1993

[54] METHOD AND CIRCUIT ARRANGEMENT FOR MONITORING THE OPERATING CONDITION OF AN ELECTRO-OPTICAL TRANSMISSION SYSTEM

[75] Inventor: Hans-Joachim Grallert, Groebenzell, Fed. Rep. of Germany

[73] Assignee: Siemens Aktiengesellschaft, Munich, Fed. Rep. of Germany

[21] Appl. No.: 560,152

[22] Filed: Jul. 31, 1990

[30] Foreign Application Priority Data

Aug. 3, 1989 [EP] European Pat. Off. ........ 89114376.0

[51] Int. Cl.$^5$ .............................................. H04B 1/10
[52] U.S. Cl. .................................... 375/104; 375/108; 375/116; 359/110
[58] Field of Search ................ 375/104, 108, 116; 359/110, 143, 152; 356/73, 73.1; 371/57.1; 370/105.1; 358/314, 315, 319; 360/37.1, 38.1; 332/350

[56] References Cited

U.S. PATENT DOCUMENTS

| | | | |
|---|---|---|---|
| 4,211,920 | 7/1980 | Wakabayashi | 359/110 X |
| 4,257,033 | 3/1981 | Ota et al. | 359/110 X |
| 4,414,676 | 11/1983 | Kraul et al. | 375/116 |

FOREIGN PATENT DOCUMENTS 2568431 7/1984 France .
2045954 11/1980 United Kingdom .

OTHER PUBLICATIONS

"Digital Relay Transmission System", *Patent Abstracts of Japan*, vol. 10, No. 113 (E-399) [2170] Apr. 26, 1986, for JP-A-60 248 051.
"Error Measuring Circuit", *Patent Abstracts of Japan*, vol. 7, No. 88 (E-170) [1233] Apr. 12, 1983, for JP-A-58 15 351.
Braun et al, "Digital Transmission on Fiber-Optic Cables in the Long-Distance Network", *Telcom Report 10*, Special, vol. 10, Dec. 1987.

*Primary Examiner*—Curtis Kuntz
*Assistant Examiner*—Tesfaldet Bocure
*Attorney, Agent, or Firm*—Hill, Steadman & Simpson

[57] ABSTRACT

For recognizing the status of a "no light" condition at the signal input of a receiving terminal, measured values that correspond to the electrical signal level of received signals are stored at given time intervals. In the absence of digital signals, the contents of the memory, potentially in combination with a further measured value, are searched for a change in the amplitude of the received signal. Given a large level change, a "no light" condition is reported.

17 Claims, 2 Drawing Sheets

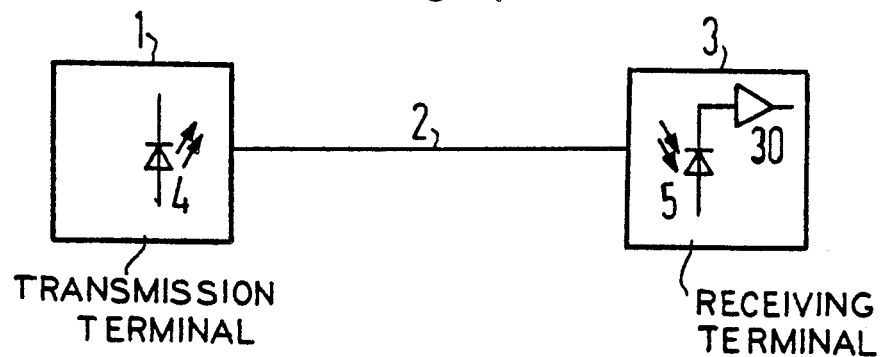
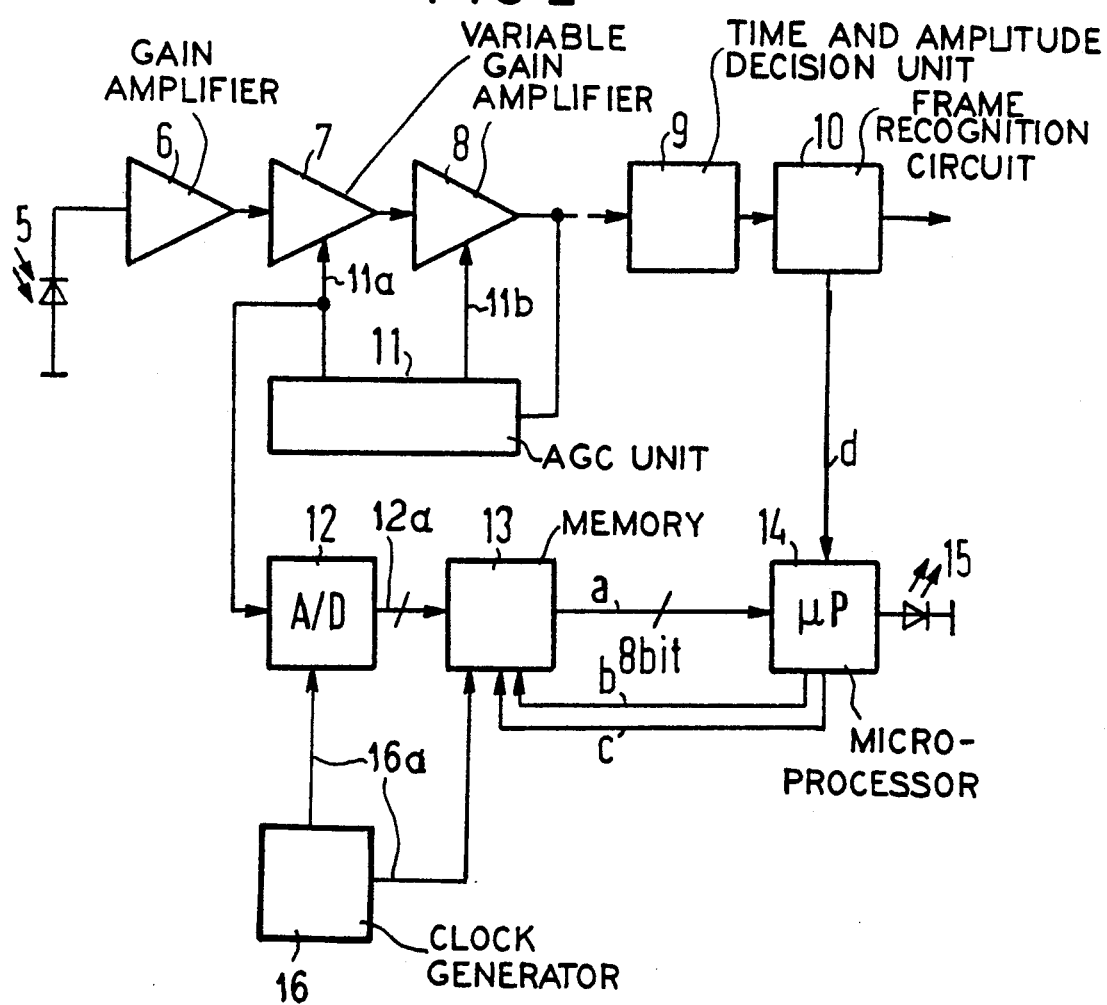

METHOD AND CIRCUIT ARRANGEMENT FOR MONITORING THE OPERATING CONDITION OF AN ELECTRO-OPTICAL TRANSMISSION SYSTEM

BACKGROUND OF THE INVENTION

1. Field of the Invention

The present invention is directed to a method and apparatus for monitoring the operating condition of an electro-optical transmission system.

2. Description of the Related Art

Electro-optical systems for the transmission of PCM signals usually employ optical receivers which utilize a photodiode to convert the optical input signal to an electrical signal. The electrical signal is subsequently amplified and converted into a serial data signal in a time and amplitude decision unit. The output of the time and amplitude decision unit is monitored to detect the occurrence of a frame identifier word. If a frame identifier word is not detected after a specified period of time, a loss of synchronization can be reported.

FIG. 1 is a basic schematic representation of an electro-optical transmission and receiving system that is commonly employed in the art. The transmission terminal 1 uses an electro-optical converter 4 to transmit light pulses along transmission line 2. The receiving line terminal 3, utilizes an opto-electrical converter 5 to convert the optical signals received along line 2 into electrical signals. These electrical signals are amplified in an amplifier 30 and supplied to the rest of the receiving line for further processing.

The transmission characteristics of a digital data link in an optical telecommunications system can be monitored at the receiving line terminal. An optical and/or electrical alarm can be triggered when given threshold characteristics of the digital data link are exceeded. This manner of monitoring the digital data link characteristics is shown, for example, in the periodical Telcom Report Spezial, "Multiplex-und Leitungseinrichtungen", Siemens, March 1987, pages 97-8.

The optical input signal level to the receiving line terminal can be monitored by tapping electrical signals from various locations in the electrical signal path, including at the gain control circuits which regulate the amplification of the optical input signal after it has been converted to an electrical signal by the photodiode. Based on the monitored signal, a decision can be made as to whether or not an optical input signal is indeed present. This determination is made by comparing the observed signal to a threshold in a threshold comparator.

Most telecommunication systems employ extremely long transmission lines. Consequently, the input to the opto-electric transducer (i.e., photodiode) at the receiving line terminal is often substantially attenuated. As a result, the construction and tuning of the threshold comparators becomes quite complex because the difference between a "light" and "no light" condition at the input is extremely small. Additionally, the strength of the optical input to the opto-electric transducer is highly dependent on weather-related conditions that have an effect on the overall cable system. Changes in the transmission terminal (i.e., changes in the characteristic of the transmission laser) can also cause fluctuations in the optical input signal level to the receiving line terminal. Signal to noise ratios also play a role in the construction and tuning of the threshold comparators since the maximum gain of the amplifiers within the receiving line terminal is usually set without applying an input signal. As a result, any excessive gain might cause the noise present at the receiving line terminal input to falsely trigger data signals within the receiving line terminal.

As a result of these difficulties, either the presence of the digital signal or the presence of a frame identifier word is checked in the receiving line terminal. The lack of a frame identifier word indicates an "asynchronous" data condition. However, the mere presence of an asynchronous data condition does not assist in determining whether the transmission link is interrupted or whether the transmission or receiving terminal has experienced a malfunction.

SUMMARY OF THE INVENTION

A method and apparatus for monitoring the operating condition of a digital electro-optical transmission/receiving system is set forth. In accordance with the method, electrical signals indicative of the output level of the optical transducer are monitored and stored at pre-determined time intervals. In the absence of recognizable digital data signals (i.e., frame identifier words), the stored values are retrieved and a comparison is made to determine whether the stored values belonging to successive time intervals differ from one another beyond a given degree. In the event that the given degree is exceeded, an error message indicating a "no light" condition is reported. Otherwise, an error message indicating an "asynchronous" data condition is reported. An electronic circuit configuration for the implementation of this method is also set forth.

The invention recognizes the fact that an abrupt disruption of the digital signal and the loss of synchronization each constitute only a single indicator of a complete loss of the optical transmission power. However, a gradual decrease in the optical signal level received at the receiving line terminal can also ultimately lead to a system failure when the received signal level falls below a level which no longer allows the receiving line terminal to maintain synchronization. As a result it becomes critical to identify whether a drop in the reception level (level discontinuity) is the cause of the loss of synchronization.

In order to properly determine the cause of a loss of synchronization, a drop in the reception level (level discontinuity) must be identified. Critical to the detection of a level discontinuity is a comparison between a signal level value measured before the level discontinuity and a signal level value measured after the level discontinuity. Therefore, measured signal level values that occur before the loss of synchronization may be stored and compared to a measured signal level value identified after the loss of synchronization.

It is also sufficient to limit the storage of the measured signal level values to those values acquired before the loss of synchronization without necessarily storing the levels occurring after the loss of synchronization. Optimally, however, at least one measured signal value should be stored after the loss of synchronization for comparison purposes. Since there is a time delay inherent in the circuits of the receiving line terminal between the time that the loss of synchronization is detected and the time that the storage of the measured values is inhibited, a measured ignal level value occurring after the level discontinuity will typically end up being stored.

The measured signal level values can be stored in either an analog or digital signal memory.

By employing the present invention, a reliable distinction between a "light" and "no light" condition is possible even where there is a comparatively small difference in the optical signal levels received at the receiving line terminal.

BRIEF DESCRIPTION OF THE DRAWINGS

Other object's features and advantages of the present invention will become apparent upon reference to the accompanying description when taken in conjunction with the following drawings, on which:

FIG. 1 is a general schematic representation of standard transmission and receiving terminals known in the art.

FIG. 2 is a schematic representation of an electro-optical circuit that constitutes the apparatus of the invention and which is used to implement the method of the present invention.

DESCRIPTION OF THE PREFERRED EMBODIMENT

Figure 3:
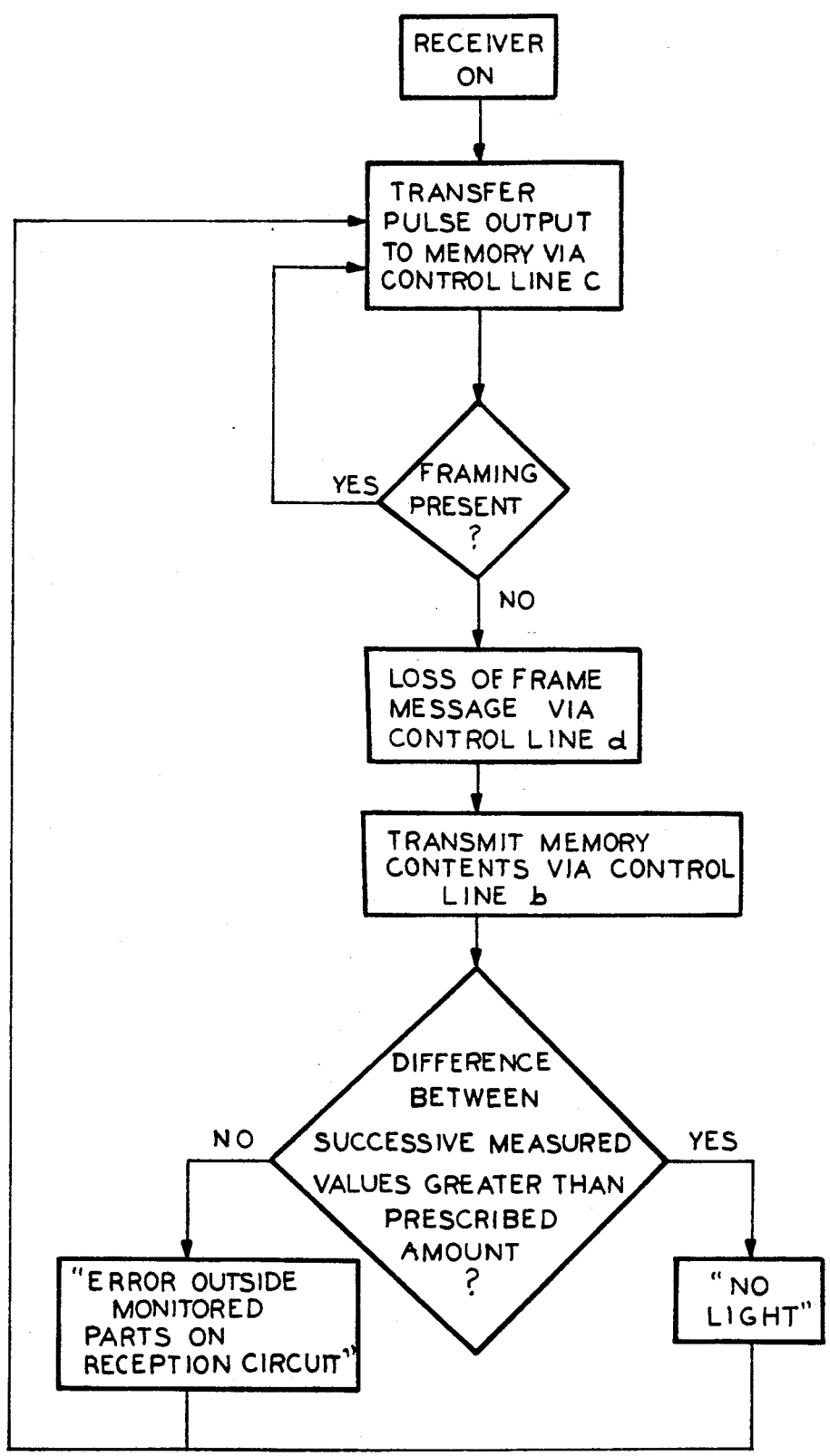
FIG. 3 is a flow charge illustrating how the measured signal level values are processed by the microprocessor.

Shown in FIG. 2 is a schematic representation of a receiving line terminal constructed in accordance with the invention and which is used to implement the method of the invention. The receiving line unit employs a photodiode 5 that accepts an optical signal from a transmission line (not shown in FIG. 2). The photodiode 5 acts as a transducer to convert the optical signa received from the transmission line to an electrical signal.

The output of the photodiode 5 is amplified by three successive gain stages 6,7,8 that comprise a galn amplifier circuit. Two of the gain stages 7,8 are variable gain amplifiers. The gain of each of the variable gain amplifiers 7,8 is controlled by an automatic gain control (AGC) unit 11. The AGC unit 11 accepts the output of the amplifier 8 and uses the signal to provide gain setting voltages 11a, 11b respectively to the variable gain amplifiers 7, 8. The AGC unit 11 operates in a standard manner to ensure that the amplitude of the signal at the output of amplifier 8 is maintained at a constant level.

The output of variable gain amplifier 8 is shown as being supplied to the input of an amplitude and time decision unit 9 (also known as an amplitude and time regenerator) which converts the signal received at its input into a serial dialog signal. However, there are standard stages between the amplifier 8 and time and amplitude decision unit 9 that are not shown for ease of illustrating the present invention. In turn, the output of the amplitude and time decision unit 9 is supplied to a frame recognition circuit 10. The frame recognition circuit 10 is used to detect the presence of a frame identifier word in the PCM transmission stream received from a transmission terminal (not shown in FIG. 2). The frame identifier word is sent from the transmission terminal to enable the receiving line terminal to maintain synchronization. If a frame identifier word is not detected by the frame recognition circuit 10 (i.e., when there is a loss of synchronization), a signal to this effect is sent along status line d.

The gain setting voltage on line 11a is also supplied to an input of an analog-to-digital (A/D) converter 12. The level of the gain setting voltage on line 11b is indicative of the strength of the optical signal detected at the photodiode 5. The A/D converter 12 converts the analog signal level at line 11a into a digital binary signal at lines 12a. These lines, in turn, are supplied to a memory 13. Clock signal outputs 16a from a clock generator 16 are used to periodically sample the signal at 11a, convert the sampled signal into a binary signal at lines 12a and store the output at line 12a of the A/D converter into the memory 13.

Other signal levels indicative of the signal strength of the optical signal may also be supplied to the A/D converter 12. For example, the outputs of variable gain amplifiers 7 or 8 may be used or, alternatively, the clock level may be observed with a filter.

The resolution of the A/D converter 12 must be carefully selected. On the one hand, the resolution must be sufficient to detect a distinction between successively measured signal level values where the signal level changes are gradual. On the other hand, the resolution must be sufficient to detect an abrupt loss of the transmission signal. Each of these conditions must be distinguishable from one another.

The apparatus utilizes a microprocessor 14. The microprocessor 14 is connected to the output of memory 13 via an 8-bit data bus a. Additionally the microprocessor 14 receives the status line d from the frame recognition circuit 10.

Two output control signals from the microprocessor 14 are supplied to the memory 13. A transfer pulse output from the microprocessor 14 is communicated along control line c to the memory 13. Additionally, a memory transfer output signal is supplied to the memory 13 via control line b to initiate the transfer of the memory contents for evaluation by the microprocessor.

The present invention, when employed in a receiving line terminal, enables the recognition of a "no light" condition at the signal input of the receiving line terminal in a simple and reliable manner. The gain control voltage sent along line 11a is sampled by the A/D converter 12 at periodic time intervals $\Delta t$. The sampled signal is converted into a digital value $P(t_n)$ in the A/D converter 12. These digital values $P(t_n)$ are stored in the memory 13.

When the frame recognition circuit 10 fails to detect the presence of a frame identifier word, it sends a signal to the microprocessor 14 along status line d that indicates an "asynchronous" condition. The digital values $P(t_n)$ that were stored shortly before the occurrence of the "asynchronous" condition are then retrieved by the microprocessor 14. These values are analyzed to detect a signal drop. If necessary, the "asynchronous" message can be delayed until the analysis is complete.

To identify whether a level discontinuity caused the loss of synchronization, a signal level value measured before the "asynchronous" condition and a signal level value measured after the "asynchronous" condition may be compared to one another in response to the receipt by the microprocessor of the "asynchronous" condition from the frame recognition circuit. Optimally, the measured value identified after the loss of synchronization is also stored in the memory 13 for this purpose. The presence of an "asynchronous" condition, when accompanied by an identified drop in the signal level, indicates an interrup of the transmission line. An "asynchronous" condition without a corresponding signal level drop indicates a fault in the transmission terminal or, respectively, in those parts of the receiving terminal that are not specifically monitored. A comparison to the measured values occurring after the detection of a loss of synchronization is not mandatory since the contents of the memory 13 alone may be evaluated for a level drop without regard to the measured values occurring after the loss of synchronization.

When the measured signal level values are sampled at the output of a control amplifier stage, then the sample period is optimally selected to be shorter than the time constant of the gain control circuitry. Otherwise, the noise at the output of the control amplifier stage may result in inaccurate measurements.

As illustrated in FIG. 3, when the receiver is on, a transfer pulse output from the microprocessor 14 is communicated along control line c to the memory 13. When the frame recognition circuit 10 fails to detect the presence of a frame identifier word, it sends a signal to the microprocessor 14 along status line d that indicates an "asynchronous" condition. A memory transfer output signal is applied to the memory 13 via control line b to initiate the transfer of the memory contents for evaluation by the microprocessor. The digital values $P(t)_n$ that were stored shortly before the occurrence of the "asynchronous" condition are then retrieved by the microprocessor 14. These values are analyzed to detect a signal drop. A signal level value measured before the "asynchronous" condition and a signal level value measured after the "asynchronous" condition are compared to one another in response to the receipt by the microprocessor of the "asynchronous" condition from the frame recognition circuit. The presence of an "asynchronous" condition, when accompanied by an identified drop in the signal level, indicates an interruption of the transmission line, and a first error message is then transmitted to the microprocessor. An "asynchronous" condition without a corresponding signal level drop indicates a fault in the transmission terminal or, respectively, in those parts of the receiving terminal that are not specifically monitored. In this case, a second error message is generated and transmitted to the microprocessor.

In one advantageous modification of the method, the time delay associated with the "asynchronous" status message is longer than the period between two sampling steps.

Storage of the measured values into the memory 13 is aborted after the "asynchronous" condition has been received by the microprocessor 14. When the period of the sampling pulses is short enough to cause at least one measured value to be stored after the occurrence of the "asynchronous" condition, the storage of the measured values can be immediately aborted. Alternatively, it may be expedient to specifically assure the storage of a measured value after the loss of synchronization. This can be done by selecting the sampling period and the evaluation time that elapses between the loss of synchronization and the report thereof to be at least one sample period apart. Likewise, the occurrence of an "asynchronous" condition itself can trigger the immediate sampling of a measured value occurring after the loss of synchronization. This latter approach would allow a greater degree of choice in selecting the given time intervals and the evaluation time intervals.

A plurality of measured values may be stored in the memory 13. In this manner, measured values would be available for analysis even when the most recently stored measured value accidentally occurs after the occurrence of the loss of synchronization due to the unavoidable time delay between the occurrence of the "asynchronous" condition and the actual transition of the receiving terminal into its "asynchronous" condition.

The sampling period that is used to sample the measured values may lie in the range of fractions of a second up to several days. In a preferred embodiment of the circuit arrangement, the sampling period is selected to be approximately one second. The period between the transition of the receiving terminal into its "asynchronous" condition and the corresponding output of a "asynchronous" message can amount to approximately five hundred microseconds.

The transmission terminal may optimally contain a scrambler and/or a coder to encrypt the data. For example, a 5B6B code may be employed. The average emitted light power is therefore constant and the average light power is likewise maintained at a constant value in the receiving terminal.

Although modifications and changes may be suggested by those skilled in the art, it is the intention of the inventor to embody within the patent warranted hereon all such changes and modifications as reasonably and properly come within the scope of his contribution to the art.

I claim:

1. A method for monitoring the operating condition of a electro-optical transmission system comprising the steps of:
   receiving digital signals from a transmission system, the digital signals each having a signal level;
   measuring the signal levels of each of the digital signals to produce measured signal level values;
   storing the measured signal level values occurring in successive time periods in a memory;
   detecting a loss of the digital signals; comparing, upon detecting the loss of the digital signals, the measured signal level values stored in the memory to one another and determine whether the measured signal level values occurring in successive time periods differ from one another in excess of a given amount;
   generating a first error message when the measured signal level values differ from one another in excess of the given amount; and
   generating a second error message when the measured signal level values differ from one another by less than the given amount.

2. A method for monitoring the operating condition of a transmission system as recited in claim 1, further compr step of aborting the storage of the measured signal level values after storing a measured signal level value occurring after the detection of the loss of the digital signal.

3. The method for monitoring the oeprating condition of a transmission system as recited in claim 1, further comprisign the step of delaying the detection of the loss of the digital signals by a sample period so that at least one measured signal level value is stored within the sample period after the loss of the digital signals but before aborting the storage of said measured signal level values.

4. A method for monitoring the operating condition of a transmission system as recited in claim 1, further comprising the step of triggering a storing of a measured signal level value upon the detection of the loss of the digital signals and aborting the storage of the measured signal level values following said step of triggering said storing of said measured signal level values.

5. A method for monitoring the operating condition of an electro-optical transmission system comprising the steps of:
   receiving optical digital signals from a transmission system each having a signal level, the optical digital signals including a frame identification word used by the receiving terminal to maintain synchronization of the optical digital signals;
   measuring the signal levels of each of the optical digital signals to produce measured signal level values;
   storing the measured signal level values occurring in successive time periods in a memory;
   detecting a loss of synchronization of the optical digital signals;
   comparing, upon detecting the loss of synchronization, the measured signal level values stored in the memory to a measured signal level value occurring after the loss of synchronization to determine whether the measured signal level values occurring before and after the loss of synchronization differ from one another in excess of a given amount;
   generating a first error message when the signal level values differ from one another in excess of the given amount; and
   generating a second error message when the signal level values differ from one another by less than the given amount.

6. A method for monitoring the operating condition of an electro-optical transmission system as recited in claim 5, further comprising the step of delaying the detection of the loss of synchroniation for a sample period so that at least one measured signal level value is stored within the sample period after the loss of synchronization but before aborting the storage of said measured signal level values.

7. A method for monitoring the operating condition of an electro-optical transmission system as recited in claim 5, further comprising the step of triggering a storing of at least oen measured signal level value upon detecting the loss of synchronization and aborting the storage of said measured signal level values following said step of triggering said storing of said at least one measured signal level value.

8. An apparatus for monitoring the operating condition of an electro-optical transmission system at a receiving line terminal comprising:
   means for producing measured signal level values corresponding to signal level values of optical digital signals received by the receiving line terminal;
   storage means for storing the measured signal level values;
   detection means for detecting a loss of synchronization of the optical digital signals and generating a status signal upon detection of the loss of synchronization; and
   means for evaluating the measured signal level values stored in the storage means upon receipt of the status signal to determine whether measured signal level values occurring in successive time periods differ by a given amount and for generating a first error message when the given amount is exceeded and a second message when the given amount is not exceeded.

9. An apparatus as recited in claim 8, wherein the storage means comprises a digital memory.

10. An apparatus as recited in claim 8, wherein the means for evaluating comprises a microprocessor.

11. An apparatus as recited in claim 8, wherein the means for producing comprises:
   a gain amplifier stage; and
   an A/D converter connected to the gain amplifier stage.

12. An apparatus as recited in claim 8, wherein the detection means comprises a frame recognition circuit.

13. An apparatus as recited in claim 8, wherein the detection means comprises a time and amplitude decision unit.

14. An apparatus for monitoring the operating condition of an electro-optical transmission system at a receiving line terminal comprising:
   an opto-electrical transducer for converting optical signals received at the receiving line terminal into electrical signals;
   a gain stage circuit connected to amplify the electrical signals from the opto-electrical transducer, the gain stage having a first output signal corresponding to signal levels of the optical signals and a second output of amplified electrical signals;
   an A/D converter connected to receive the first output signal from the gain stage circuit, the A/D converter having a binary output;
   a time and amplitude decision circuit connected to receive the second output of the gain stage circuit;
   a frame recognition circuit connected to receive an output signal from the time and amplitude decision circuit, the frame recognition circuit generating a status signal output, indicating a loss of synchronization of the optical signals, when the frame recognition circuit detects the absence of a frame identifier word;
   a memory connected to receive the binary output from the A/D converter; and
   a microprocessor connected to receive the status signal output from the frame recognition circuit and operably connected to read the memory.

15. An apparatus for monitoring the operating condition of an electro-optical transmission system at a receiving line terminal comprising:
   means for producing measured signal level values corresponding to signal level values of optical digital signals received by the receiving line terminal; and
   means for evaluating the measured signal level values upon detection of a loss of synchronization, including means for detecting said loss of synchronization, of the optical digital signals to determine whether measured signal level values occurring in successive time periods differ by a given amount and for generating a first error message when the given amount is exceeded and a second error message when the given amount is not exceeded.

16. An apparatus as recited in claim 15, wherein said means for producing comprises:
   an opto-electrical transducer for converting optical signals received at the receiving line terminal into electrical signals;
   a gain stage circuit connected to amplify the electrical signals from the opto electrical transducer, the gain stage having a first output signal corresponding to signal levels of the optical signals and a second output signal as amplified electrical signals supplied to said means for evaluating the measured signal level values; and
   an A/D converter connected to receive the first output signal from the gain stage circuit, the A/D converter having a binary output, said means for evaluating connected to receive said binary output.

17. An apparatus as recited in claim 15, wherein the means for evaluating comprises:
- a time and amplitude decision circuit having an input connected to a variable gain amplifier;
- a frame recognition circuit connected to receive an output signal from the time and amplitude decision circuit, the frame recognition circuit generating a status signal output, indicating a loss of synchronization of the optical signals when the frame recognition circuit detects the absence of a frame identifier word;
- a memory connected to receive the measured signal level values; and
- a microprocessor connected to receive the status signal output from the frame recognition circuit and operably connected to read the memory upon detection of a loss of synchronization.

* * * * *